(12) United States Patent
Koide

(10) Patent No.: US 11,556,035 B2
(45) Date of Patent: Jan. 17, 2023

(54) DISPLAY DEVICE AND SEMICONDUCTOR SUBSTRATE

(71) Applicant: Japan Display Inc., Tokyo (JP)

(72) Inventor: Gen Koide, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 8 days.

(21) Appl. No.: 17/203,778

(22) Filed: Mar. 17, 2021

(65) Prior Publication Data

US 2021/0294167 A1  Sep. 23, 2021

(30) Foreign Application Priority Data

Mar. 18, 2020 (JP) .............................. JP2020-048058

(51) Int. Cl.
| | |
|---|---|
| *G02F 1/1362* | (2006.01) |
| *G02F 1/1343* | (2006.01) |
| *G02F 1/1335* | (2006.01) |
| *G02F 1/136* | (2006.01) |
| *G02F 1/1368* | (2006.01) |

(52) U.S. Cl.
CPC .... *G02F 1/136227* (2013.01); *G02F 1/13606* (2021.01); *G02F 1/13629* (2021.01); *G02F 1/133512* (2013.01); *G02F 1/134363* (2013.01); *G02F 1/13685* (2021.01); *G02F 1/134318* (2021.01); *G02F 1/134336* (2013.01)

(58) Field of Classification Search
None
See application file for complete search history.

(56) References Cited

U.S. PATENT DOCUMENTS

| | | | |
|---|---|---|---|
| 2002/0105604 A1* | 8/2002 | Ha | G02F 1/13458 349/43 |
| 2014/0299881 A1* | 10/2014 | Oda | H01L 27/124 438/151 |
| 2016/0238903 A1* | 8/2016 | Morimoto | G02F 1/136286 |
| 2016/0246104 A1* | 8/2016 | Yamada | G02F 1/133345 |
| 2017/0090262 A1* | 3/2017 | Itou | G02F 1/1337 |
| 2017/0192279 A1* | 7/2017 | Maede | G02F 1/136286 |
| 2019/0056620 A1* | 2/2019 | Akiyoshi | G02F 1/133512 |
| 2019/0157304 A1 | 5/2019 | Miyamoto et al. | |
| 2020/0183235 A1* | 6/2020 | Tsuei | G06F 3/0412 |

FOREIGN PATENT DOCUMENTS

JP  2019-95578 A  6/2019

\* cited by examiner

*Primary Examiner* — Shan Liu

(74) *Attorney, Agent, or Firm* — Xsensus LLP

(57) ABSTRACT

According to one embodiment, a semiconductor substrate including, a switching element, a first organic insulating film, first and second metal lines arranged in a first direction and extending in a second direction, and a metal electrode located between the first and second metal lines. The first organic insulating film includes first and second surfaces. The switching element is covered with the first surface. The first and second metal lines and the metal electrode are located on the second surface side. The first metal line includes a first portion extending in the second direction and a second portion having a width larger than a width of the first portion. The second portion includes arcuate first and second edge. The metal electrode has a polygonal shape having n corners or an elliptic shape where n is larger than four.

16 Claims, 13 Drawing Sheets

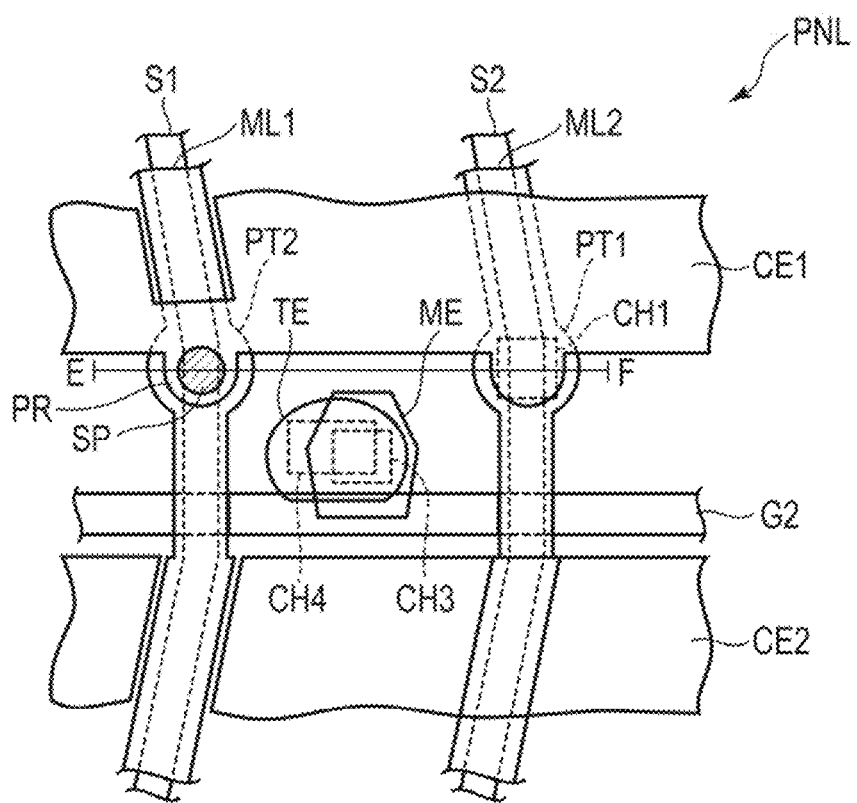
F I G. 13

DISPLAY DEVICE AND SEMICONDUCTOR SUBSTRATE

CROSS-REFERENCE TO RELATED APPLICATIONS

This application is based upon and claims the benefit of priority from Japanese Patent Application No. 2020-048058, filed Mar. 18, 2020, the entire contents of which are incorporated herein by reference.

FIELD

Embodiments described herein relate generally to a display device and a semiconductor substrate.

BACKGROUND

Recently, various display devices in which touch sensors are incorporated have been proposed. In one example, a display device structured such that electrodes formed on a display panel serve as sensor electrodes in a touch sensing mode, and serve as common electrodes in a display mode has been disclosed. As a touch sensing method, either mutual capacitive sensing or self capacitive sensing is applied. In the touch sensing mode, sensing is carried out as a touch drive voltage is applied to the sensor electrode through a signal line.

In addition, a structure of a display device comprising a touch sensor having sensor electrodes in an insular shape arrayed in a matrix, wherein a pixel electrode is connected to a semiconductor layer via electrodes of three layers, i.e., a drain electrode in the same layer as a signal line, a metal electrode in the same layer as a metal line, and a transparent electrode in the same layer as a sensor electrode, is known.

BRIEF DESCRIPTION OF THE DRAWINGS

FIG. 13 is a plan view showing a position of a spacer.

DETAILED DESCRIPTION

Figure 1:
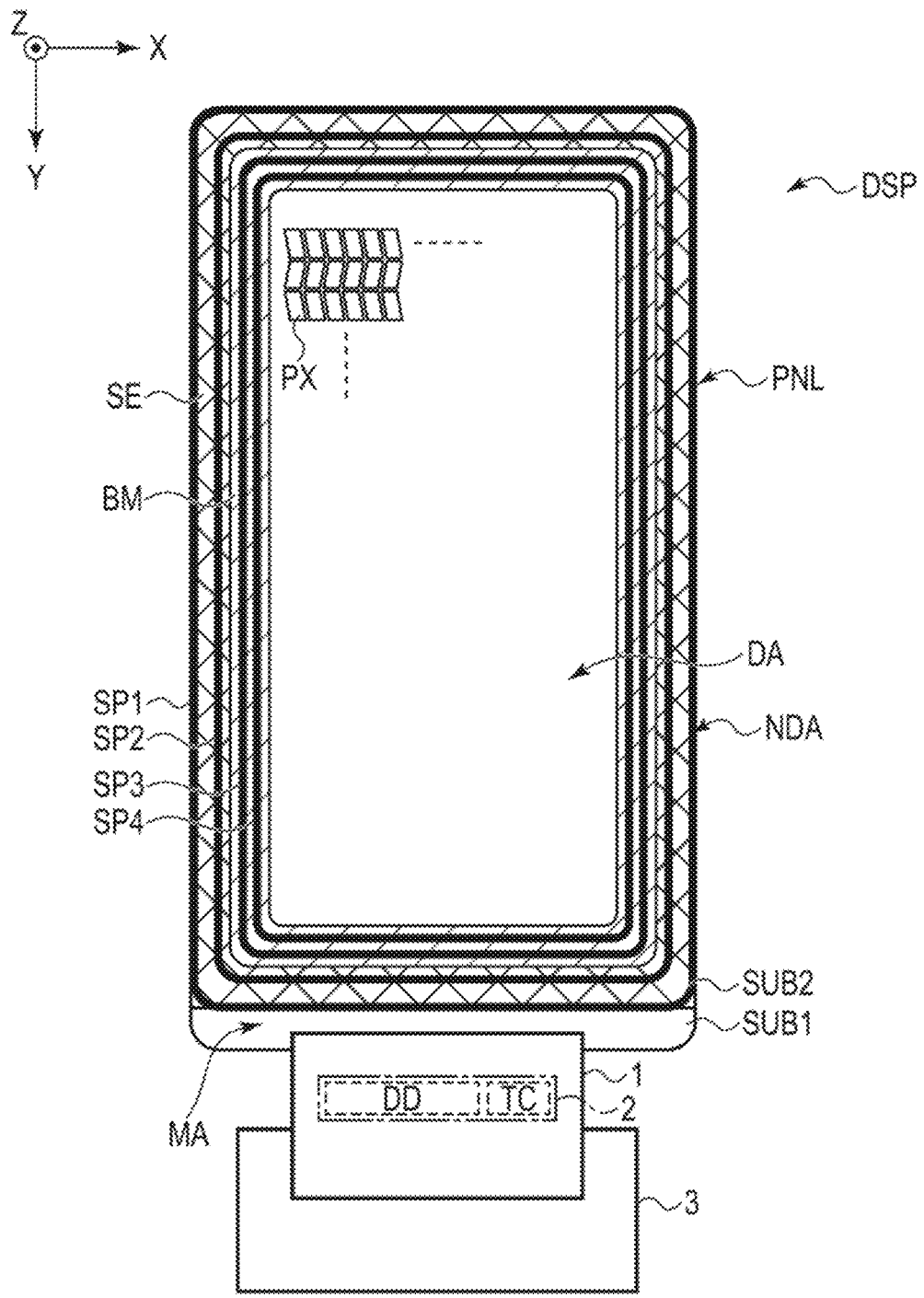
FIG. 1 is a plan view showing an appearance of a display device of the embodiments.

In general, according to one embodiment, there is provided a semiconductor substrate including, a switching element, a first organic insulating film covering the switching element, a first metal line and a second metal line arranged in a first direction and extending in a second direction intersecting the first direction, and a metal electrode in an insular shape located between the first metal line and the second metal line. The first organic insulating film includes a first surface and a second surface on a side opposite to the first surface. The switching element is covered with the first surface. The first metal line, the second metal line, and the metal electrode are located on the second surface side. The first metal line includes a first portion extending in the second direction and a second portion having a width larger than a width of the first portion. The second portion includes an arcuate first edge and an arcuate second edge located on a side opposite to the first edge, in planar view. The metal electrode has a polygonal shape having n corners or an elliptic shape where n is larger than four.

According to another embodiment, there is provided a display device including a scanning line extending in the first direction, a signal line extending in a second direction intersecting the first direction, a first insulating film covering the signal line, a first metal line arranged on the first insulating film and extending while overlaid on the signal line, a metal electrode in an insular shape arranged on the first insulating film and formed of a same material as the first metal line, a second insulating film covering the first metal line and the metal electrode, a first common electrode located on the second insulating film, and a light-shielding layer including a first light-shielding portion overlaid on the scanning line and extending in the first direction and a second light-shielding portion overlaid on the signal line and extending in the second direction. The first metal line includes a first portion overlaid on the second light-shielding portion and extending in the second direction and a second portion overlaid on the first light-shielding portion and having a width larger than a width of the first portion. The first common electrode is in contact with the second portion through a first contact hole formed in the second insulating film at a position overlaid on the second portion. The second portion includes an arcuate first edge and an arcuate second edge located on a side opposite to the first edge, in planar view.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First, a display device DSP according to the embodiments will be described in detail. In the embodiments, a liquid crystal display device is exemplified as the display device DSP.

FIG. 1 is a plan view showing an appearance of a display device DSP of the embodiments.

For example, the first direction X, the second direction Y, and the third direction Z are orthogonal to each other but may intersect at an angle other than 90 degrees. The first direction X and the second direction Y correspond to the directions parallel to the surface of a substrate which constitutes the display device DSP, and the third direction Z corresponds to the thickness direction of the display device DSP. In the present specification, a direction toward a tip of an arrow indicating the third direction Z is referred to as upward (or merely above), and a direction toward the opposite side from the pointing end of the arrow is referred to as downward (or merely below). In addition, an observation position at which the display device DSP is observed is assumed to be located on the side of the arrow tip indicating the third direction Z, and viewing from the observation position toward the X-Y plane defined by the first direction X and the second direction Y is referred to as a planar view.

A plan view of the display device DSP in the X-Y plane is illustrated. The display device DSP comprises a display panel PNL, a flexible printed circuit 1, an IC chip 2, and a circuit board 3.

The display panel PNL is a liquid crystal display panel, and comprises a first substrate SUB1, a second substrate SUB2, a sealant SE, a light-shielding layer BM, spacers SP1 to SP4, and a liquid crystal layer LC to be described later. In addition, the display panel PNL comprises a display portion DA on which an image is displayed and a non-display portion NDA in a frame shape surrounding the display portion DA. The second substrate SUB2 is opposed to the first substrate SUB1. The first substrate SUB1 includes a mounting portion MA which extends in the second direction Y more than the second substrate SUB2. The first substrate SUB1 is a semiconductor substrate comprising thin-film transistors as described later and is also referred to as an array substrate. The second substrate SUB2 comprises color filters as described later and is also referred to as a color filter substrate.

The sealant SE is located in the non-display area NDA to bond the first substrate SUB1 and the second substrate SUB2. The light-shielding layer BM is located in the non-display portion NDA. The sealant SE is provided at a position overlaid on the light-shielding layer BM in planar view. In FIG. 1, an area where the sealant SE is arranged and an area where the light-shielding layer LS is arranged are represented by different hatch lines, and an area where the sealant SE and the light-shielding layer LS are overlaid is represented by crosshatching. The light-shielding layer BM is provided on the second substrate SUB2.

The spacers SP1 to SP4 are all located in the non-display portion NDA. The spacer SP1 is located in the outermost periphery of the display panel PNL. The spacer SP2 is located on a side closer to the display portion DA than the spacer SP1. The spacers SP1 and SP2 are overlaid on the sealant SE. The spacers SP3 and SP4 are located on a side closer to the display portion DA than the sealant SE.

The display portion DA is located at an inner side surrounded by the light-shielding layer BM. The display panel PNL comprises pixels PX arrayed in a matrix in the first direction X and the second direction Y, in the display portion DA.

The flexible printed circuit 1 is mounted on a mounting portion MA and is connected to the circuit board 3. The IC chip 2 is mounted on the flexible printed circuit 1. Incidentally, the IC chip 2 may be mounted on the mounting portion MA. A display driver DD which outputs a signal necessary for image display in a display mode of displaying an image is incorporated in the IC chip 2. In addition, in the example illustrated, a touch controller TC which controls a touch sensing mode of detecting approach or contact of an object to the display device DSP, is incorporated in the IC chip 2. In the drawing, the IC chip 2 is represented by a one-dot chain line, and the display driver DD and the touch controller TC are represented by dotted lines.

The display panel PNL of the present embodiment may be a transmissive display panel having a transmissive display function of displaying an image by selectively transmitting light from a rear surface of the first substrate SUB1, a reflective display panel having a reflective display function of displaying an image by selectively reflecting light from a front surface of the second substrate SUB2, or a transflective display panel having the transmissive display function and the reflective display function.

In addition, the details of the configuration of the display panel PNL are not explained here, but the display panel PNL may have a configuration corresponding to any one of a display mode using a lateral electric field produced along the substrate main surface, a display mode using a longitudinal electric field produced along the normal of the substrate main surface, a display mode using an inclined electric field which is tilted obliquely with respect to the substrate main surface, and a display mode using an appropriate combination of the above lateral electric field, longitudinal electric field, and inclined electric field. The main surface of the substrate is a surface parallel to an X-Y plane defined by the first direction X and the second direction Y.

Figure 2:
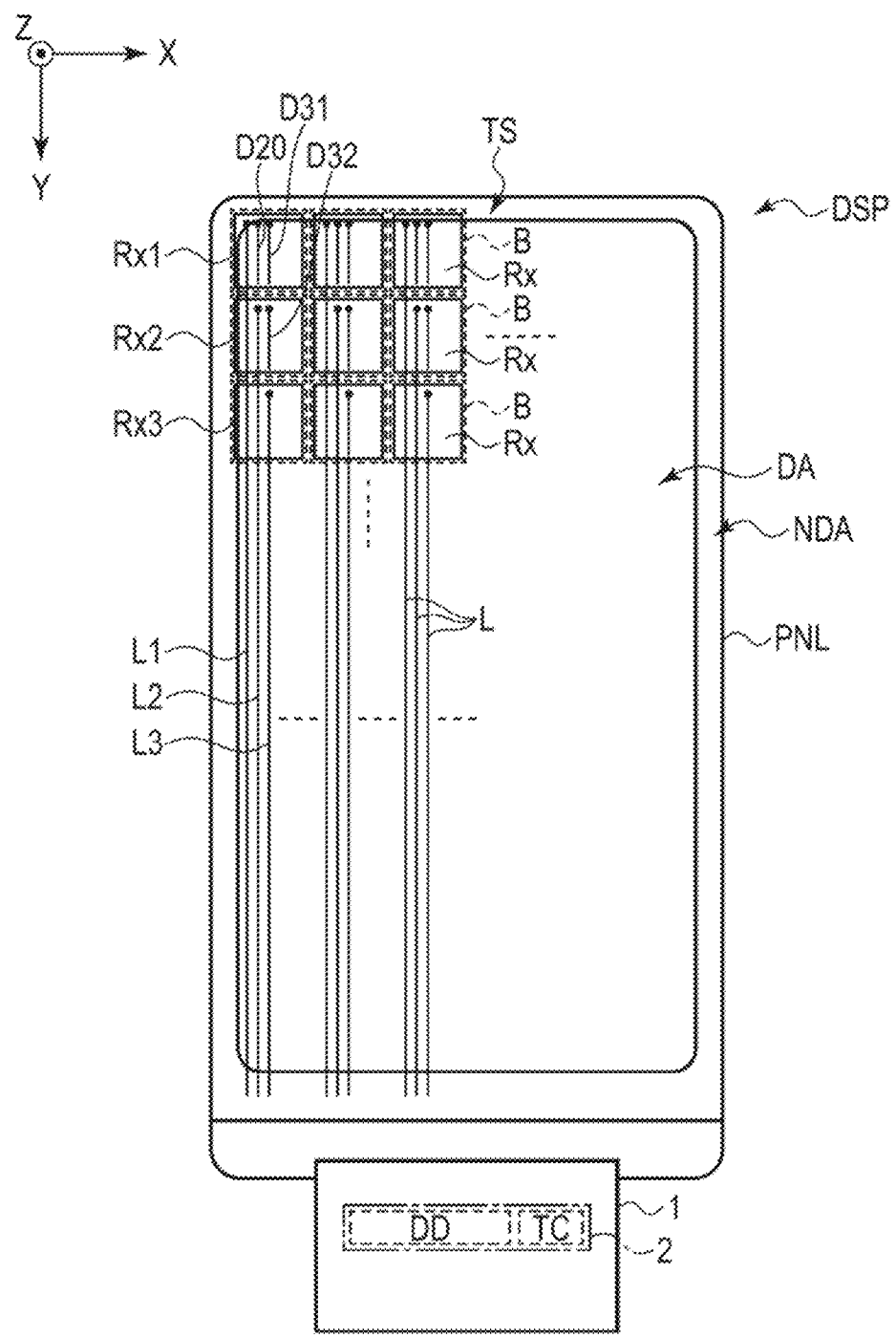
FIG. 2 is a plan view showing a configuration example of a touch sensor.

FIG. 2 is a plan view showing a configuration example of a touch sensor TS. A self-capacitive touch sensor TS will be described below. However, the touch sensor TS may be a mutual-capacitive sensor.

The touch sensor TS comprises sensor electrodes Rx (Rx1, Rx2, etc.) arrayed in a matrix, and sensor lines L (L1, L2, etc.). The sensor electrodes Rx are located in the display portion DA and arrayed in a matrix in the first direction X and the second direction Y. A sensor electrode Rx constitutes one sensor block B. The sensor block B is the minimum unit capable of performing the touch sensing. The sensor lines L extend in the second direction Y and are arranged in the first direction X in the display portion DA. Each of the sensor lines L is provided at, for example, a position overlaid on a signal line S to be described later. In addition, each of the sensor lines L is drawn to the non-display portion NDA and is electrically connected to the IC chip 2 via the flexible printed circuit 1.

The relationship between the sensor lines L1 to L3 arranged in the first direction X and the sensor electrodes Rx1 to Rx3 arranged in the second direction Y will be focused here. The sensor line L1 is overlaid on the sensor electrodes Rx1 to Rx3 and is electrically connected to the sensor electrode Rx1.

The sensor line L2 is overlaid on the sensor electrodes Rx2 and Rx3 and is electrically connected to the sensor electrode Rx2. A dummy line D20 is remote from the sensor line L2. The dummy line D20 is overlaid on the sensor electrode Rx1 and is electrically connected to the sensor electrode Rx1. The sensor line L2 and the dummy line D20 are located on the same signal line.

The sensor line L3 is overlaid on the sensor electrode Rx3 and is electrically connected to the sensor electrode Rx3. A dummy line D31 is overlaid on the sensor electrode Rx1 and is electrically connected to the sensor electrode Rx1. A dummy line D32 is remote from the dummy line D31 and the sensor line L3. The dummy line D32 is overlaid on the sensor electrode Rx2 and is electrically connected to the sensor electrode Rx2. The sensor line L3, and the dummy lines D31 and D32 are located on the same signal line.

In the touch sensing mode, the touch controller TC applies a touch drive voltage to the sensor lines L. The touch drive voltage is thereby applied to the sensor electrodes Rx and sensing is performed with the sensor electrodes Rx. A sensor signal corresponding to a result of sensing with each of the sensor electrodes Rx is output to the touch controller TC via the sensor line L. The touch controller TC or an external host detects occurrence of approach or contact of an object to the display device DSP, and the position coordinates of the object, on the basis of the sensing signal.

Incidentally, in the display mode, the sensor electrode Rx functions as a common electrode CE to which a common voltage (Vcom) is applied. The common voltage is applied from, for example, a voltage supply unit included in the display driver DD via the sensor lines L.

Figure 3:
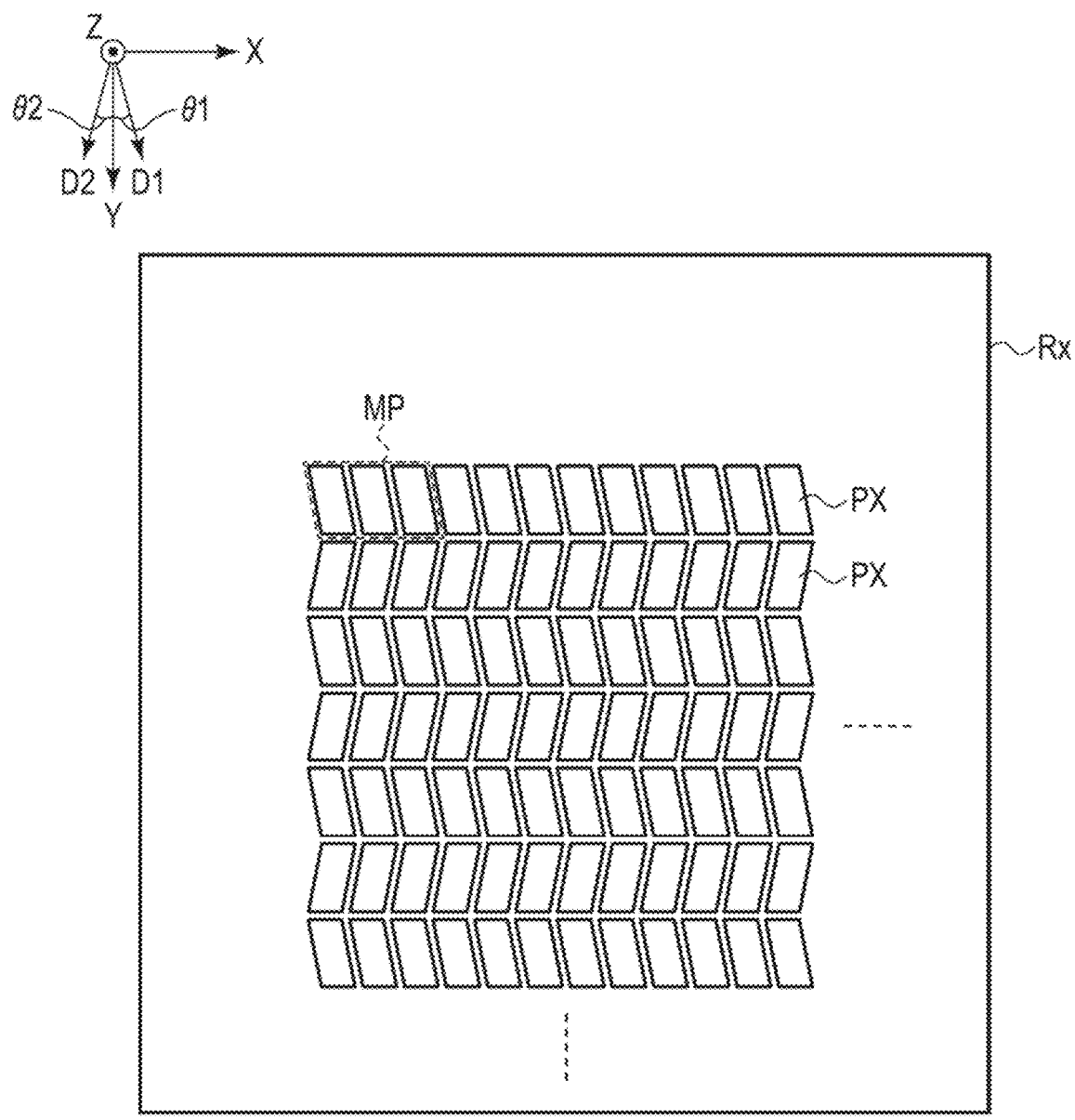
FIG. 3 is a plan view showing a relationship between a pixel and a sensor electrode shown in FIG. 2.

FIG. 3 is a plan view showing a relationship between the sensor electrode Rx shown in FIG. 2 and the pixel PX. In FIG. 3, a direction intersecting the second direction Y counterclockwise at an acute angle is defined as direction D1, and a direction intersecting the second direction Y clockwise at an acute angle is defined as direction D2. Incidentally, angle θ1 made between the second direction Y and the direction D1 is substantially the same as angle θ2 made between the second direction Y and the direction D2.

A sensor electrode Rx is arranged across the pixels PX. In the example illustrated, the pixels PX located in the odd-numbered rows along the second direction Y are extended in the direction D1. In addition, the pixels PX located in the even-numbered rows along the second direction Y are extended in the direction D2. Incidentally, the pixel PX indicates a minimum unit that can be individually controlled in accordance with the pixel signal, and may be referred to as a sub-pixel. In addition, a minimum unit for realizing color display may be referred to as a main pixel MP. The main pixel MP is composed of sub-pixels PX displaying colors different from each other. For example, the main pixel MP comprises a red pixel which displays a red color, a green pixel which displays a green color, and a blue pixel which displays a blue color as the sub-pixels PX. Furthermore, the main pixel MP may comprise a white pixel which displays a white color.

For example, in one sensor electrode Rx, 60 to 70 main pixels MP are arranged along the first direction X, and 60 to 70 main pixels MP are arranged along the second direction Y.

Figure 4:
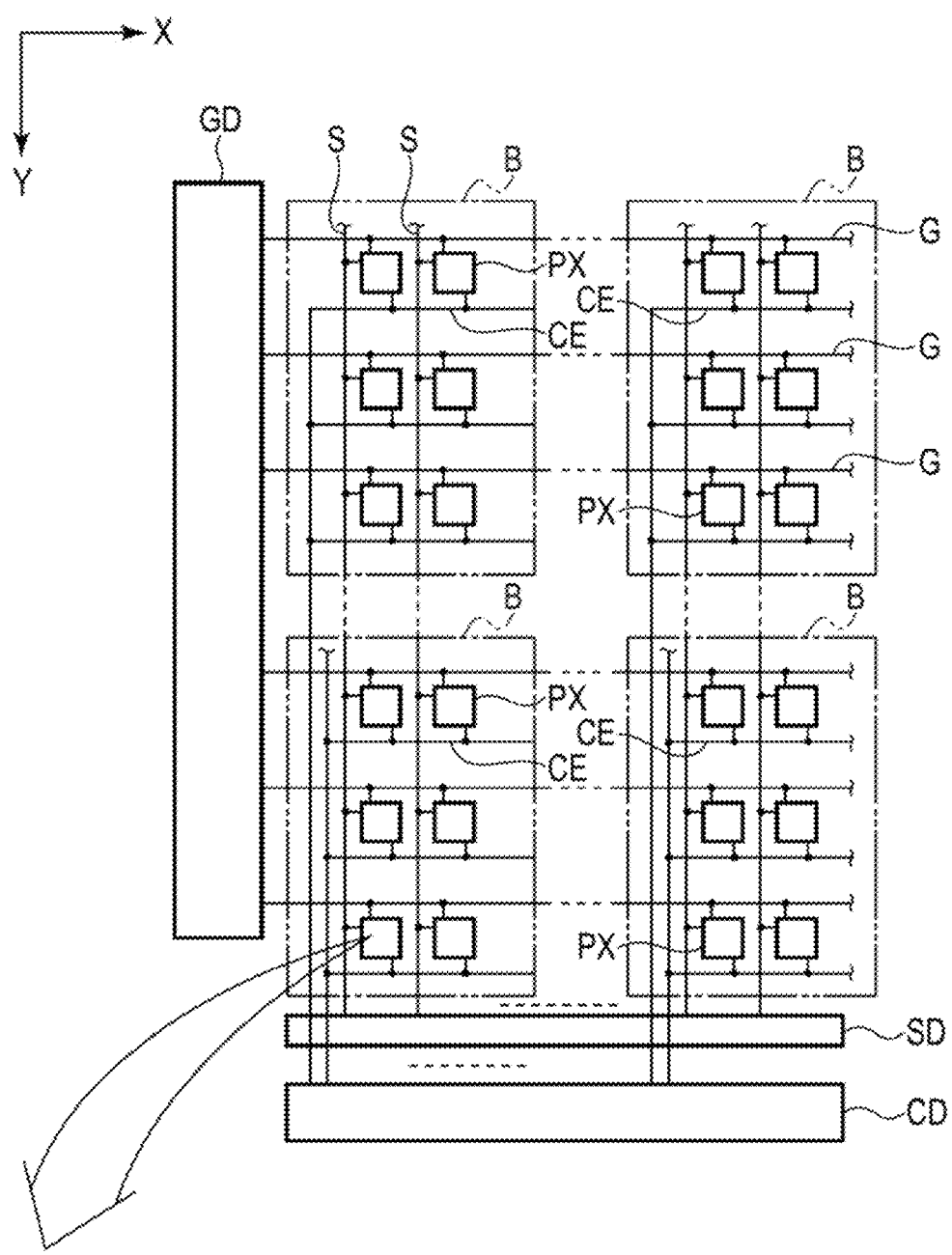
FIG. 4 is a view showing a basic configuration of a pixel and an equivalent circuit.
Figure 4:
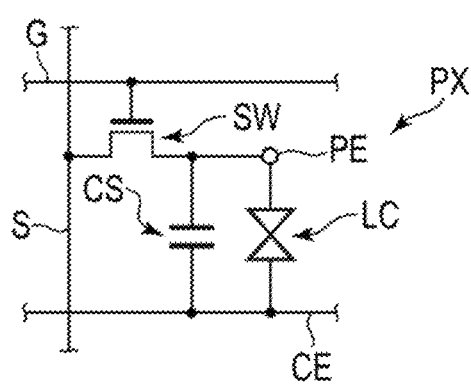

FIG. 4 is an illustration showing a basic structure of the pixel PX and an equivalent circuit.

The scanning lines G are connected to a scanning line drive circuit GD. The signal lines S are connected to a signal line drive circuit SD. Incidentally, the scanning lines G and the signal lines S may not extend linearly, but may be partially curved or bent. For example, the signal lines S are assumed to extend in the second direction Y even if the signal lines S are partially curved or bent.

The common electrode CE is provided for each of sensor blocks B. The common electrode CE is connected to a voltage supply unit CD of a common voltage (Vcom) and is arranged across the pixels PX. In addition, each of the common electrodes CE is also connected to the touch controller TC as described above and forms the sensor electrode Rx to which the touch drive voltage is applied in the touch sensing mode.

Each of the pixels PX comprises a switching element SW, a pixel electrode PE, the common electrode CE, a liquid crystal layer LC and the like. The switching element SW is composed of, for example, a thin-film transistor (TFT) and is electrically connected to the scanning line G and the signal line S. The scanning line G is connected to the switching elements SW in each of the pixels PX arranged in the first direction X. The signal line S is connected to the switching elements SW in each of the pixels PX arranged in the second direction Y. The pixel electrode PE is electrically connected to the switching element SW. Each pixel electrode PE is opposed to the common electrode CE, and drives the liquid crystal layer LC by an electric field produced between the pixel electrode PE and the common electrode CE. A storage capacitance CS is formed, for example, between an electrode of the same potential as the common electrode CE and an electrode of the same potential as the pixel electrode PE.

Figure 5:
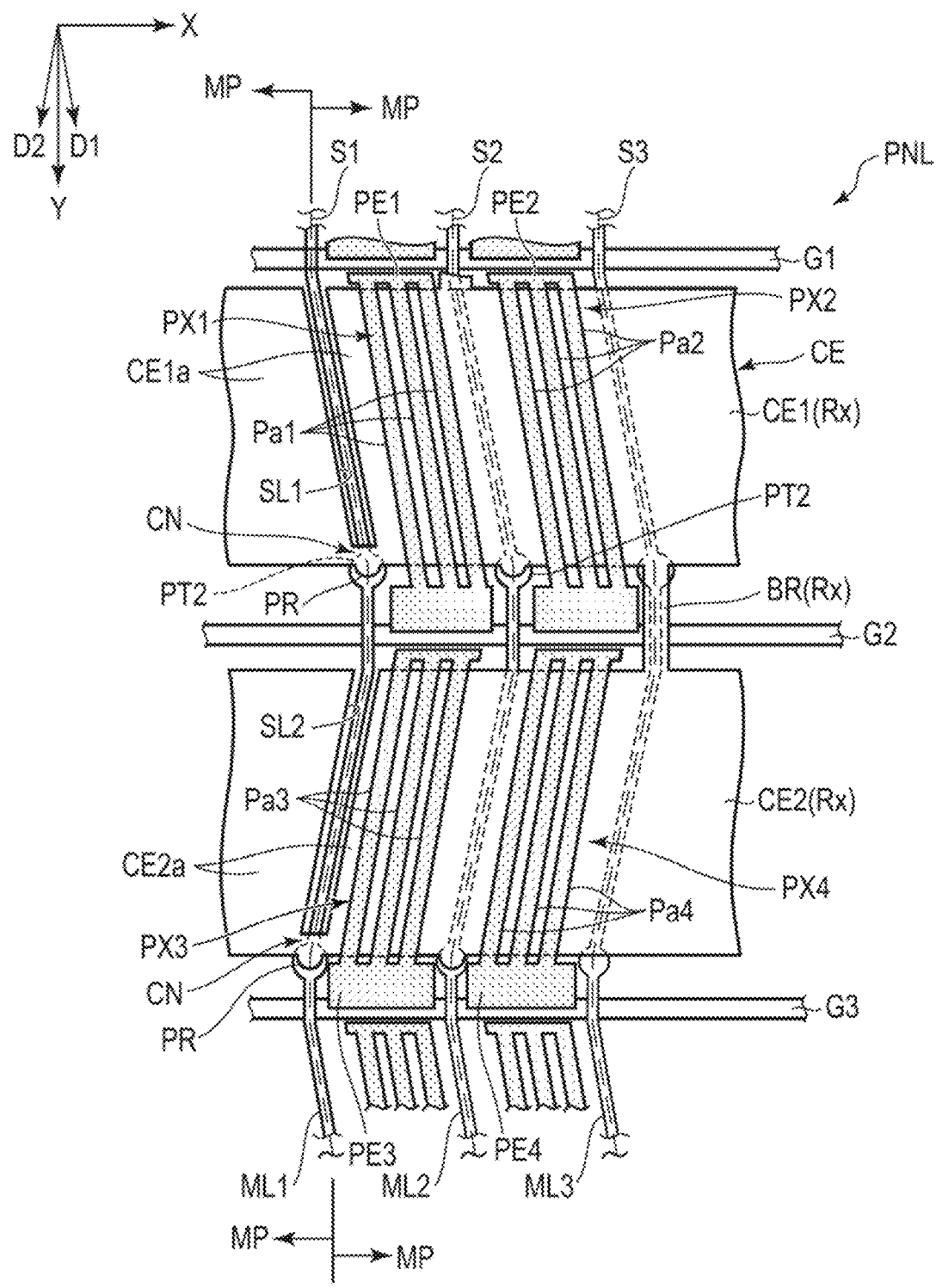
FIG. 5 is a plan view showing an example of a pixel layout.

FIG. 5 is a plan view showing an example of a pixel layout.

The scanning lines G1 to G3 extend linearly along the first direction X and are arranged in the second direction Y to be spaced apart from each other. The signal lines S1 to S3 extend substantially along the second direction Y and are arranged in the first direction X to be spaced apart from each other. In addition, the display panel PNL comprises metal lines ML1 to ML3 extending substantially along the second direction Y and arranged in the first direction X to be spaced apart from each other. The metal lines ML1 to ML3 extend to be overlaid on the signal lines S1 to S3, respectively. In addition, although described later, each of the metal lines ML1 to ML3 includes an extended part (second parts PT2) which is extended to be connected to common electrodes CE1 and CE2.

The pixel electrodes PE1 and PE2 are located between the scanning lines G1 and G2. The pixel electrodes PE1 and PE2 are arranged in the first direction X. The pixel electrodes PE3 and PE4 are located between the scanning lines G2 and G3. The pixel electrodes PE3 and PE4 are arranged in the first direction X. The pixel electrodes PE1 and PE3 are arranged between the signal lines S1 and S2, and the pixel electrodes PE2 and PE4 are arranged between the signal lines S2 and S3.

The pixel electrodes PE1 and PE2 include strip electrodes Pa1 and Pa2 extending along the direction D1, respectively. The pixel electrodes PE3 and PE4 include strip electrodes Pa3 and Pa4 extending along the direction D2, respectively. In the example illustrated, the number of strip electrodes Pa1 to Pa4 is three. However, the number of strip electrodes may be two or less or four or more.

The common electrode CE1 is arranged across the pixels PX1 and PX2. The common electrode CE2 is arranged across the pixels PX3 and PX4. The common electrodes CE1 and CE2 are arranged in the second direction Y. The common electrodes CE1 and CE2 are included in one sensor electrode Rx shown in FIG. 2. The common electrode CE1 is overlaid on the signal lines S1 to S3. The pixel electrodes PE1 and PE2 are overlaid on the common electrode CE1. The common electrode CE2 is overlaid on the signal lines S1 to S3. The pixel electrodes PE3 and PE4 are overlaid on the common electrode CE2. In the example illustrated, the scanning line G2 is located between the common electrodes CE1 and CE2.

In addition, the common electrode CE1 includes a slit SL1, and the common electrode CE2 includes a slit SL2. The slits SL1 and SL2 are located on a boundary between the main pixels MP. That is, in the common electrode CE1, a part CE1a overlaid on one main pixel MP is divided by the slit SL1. Similarly, in the common electrode CE2, a part CE2a overlaid on one main pixel MP is divided by the slit SL2. The parts CE1a are connected to each other by a connecting portion CN. Similarly, the parts CE2a are connected to each other by a connecting portion CN. The connecting portion CN of the common electrode CE1 and CE2 is overlaid on the signal line S1 and the metal line ML1 in the example illustrated. In addition, each of the common electrodes CE1 and CE2 includes protruding portions PR that protrude in the second direction Y, although described later. The protruding portions PR are overlaid on extended portions (second portions PT) of the metal lines ML1 and ML2.

In addition, the common electrode CE includes a bridge portion BR located between the common electrode CE1 and the common electrode CE2. In the example illustrated, the bridge portion BR is overlaid on the signal line S3 and the metal line ML3. The bridge portion BR is formed integrally with the common electrode CE1 and the common electrode CE2 to make electric connection between the common electrode CE1 and the common electrode CE2. The bridge portion BR is included in the sensor electrode Rx, similarly to the common electrode CE1 and the common electrode CE2.

Figure 6:
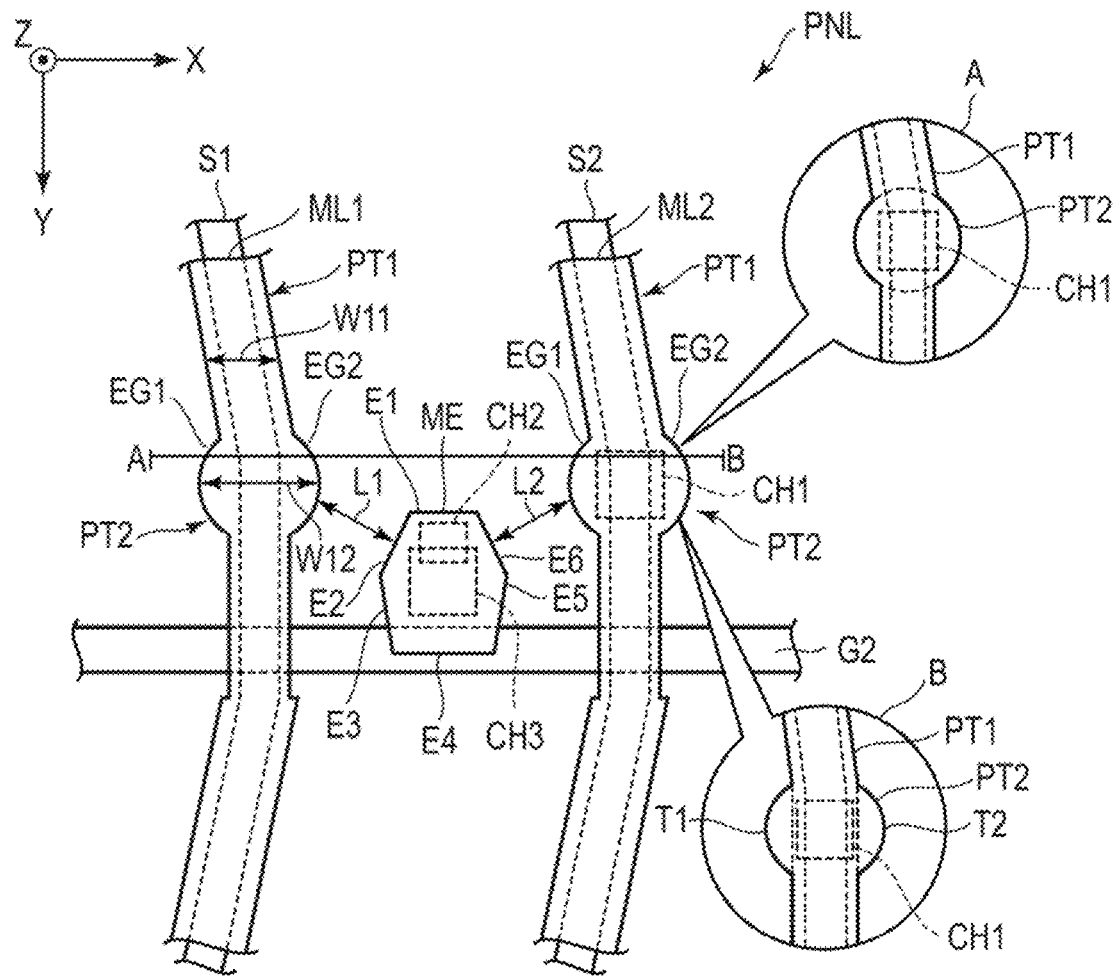
FIG. 6 is a plan view showing a metal line of the embodiments, and a shape of a metal electrode.

FIG. 6 is a plan view showing shapes of the metal lines ML1 and ML2 and a metal electrode ME of the embodiments.

Each of the metal lines ML1 and ML2 includes a first portion PT1 extending in the second direction Y and a second portion PT2 having a width W12 larger than a width W11 of the first portion PT1. The second portion PT2 is overlaid on a contact hole CH1 formed in an insulating film 15 to be described later. The second portion PT2 is connected to the common electrode through the contact hole CH1. The second portion PT2 includes an arcuate first edge EG1 and an arcuate second edge EG2 located on a side opposite to the first edge EG1, in planar view. In addition, as shown inside frame A of FIG. 6, when the shape of the second portion PT2 is represented by a dotted line, the second portion PT2 is formed in a circular shape. Incidentally, the second portion PT2 is formed in a polygonal shape larger than four sides. Several sides of the sides forming the polygonal shape may be curves. In addition, as shown inside frame B of FIG. 6, the second portion PT2 can be assumed to include protruding portions T1 and T2 that protrude from the outer shape of the first portion PT1. In the example illustrated, the protruding portions T1 and T2 have a semicircular shape but may have a polygonal shape larger than four sides.

To suppress occurrence of parasitic capacitance between the second portions PT2 and the metal electrode ME, the second portions PT2 are located remote from the metal electrode ME by predetermined distances L1 and L2. By forming the second portion PT2 in a circular shape or a polygonal shape having sides more than four sides, the second portion PT2 can be arranged more closely to the scanning line G2 side as compared with a case where the second portion PT2 has a rectangular shape. In this case, too, the predetermined distances between the second portions PT2 and the metal electrode ME can be maintained.

The display panel PNL comprises a metal electrode ME located between the metal line ML1 and the metal line ML2 and formed in an insular shape. The metal electrode ME is formed of the same material as that of the metal lines ML1 and ML2. The metal electrode ME is shaped in a polygon having n corners where n is an integer larger than four. Incidentally, several sides, of the sides forming the polygonal shape may be curves. In addition, the metal electrode ME may be formed in an elliptic shape. By forming the metal electrode ME in a polygonal shape larger than four sides or an elliptic shape, the second portion PT2 can be arranged much more closely to the scanning line G2 side while maintaining the predetermined distances L1 and L2.

The metal electrode ME has sides E1, E2, E3, E4, E5, and E6. In the example illustrated, the sides E1 and E4 extend in the first direction X, and the side E1 is formed to be shorter than the side E4. In addition, the metal electrode ME is overlaid on a contact hole CH2 formed in an insulating film 14 to be described later. The metal electrode ME is connected to a drain electrode in an insular shape through the contact hole CH2. In addition, the metal electrode ME is overlaid on a contact hole CH3 formed in an insulating film 15 to be described later. The metal electrode ME is connected to a transparent electrode in an insular shape through the contact hole CH3.

Figure 7:
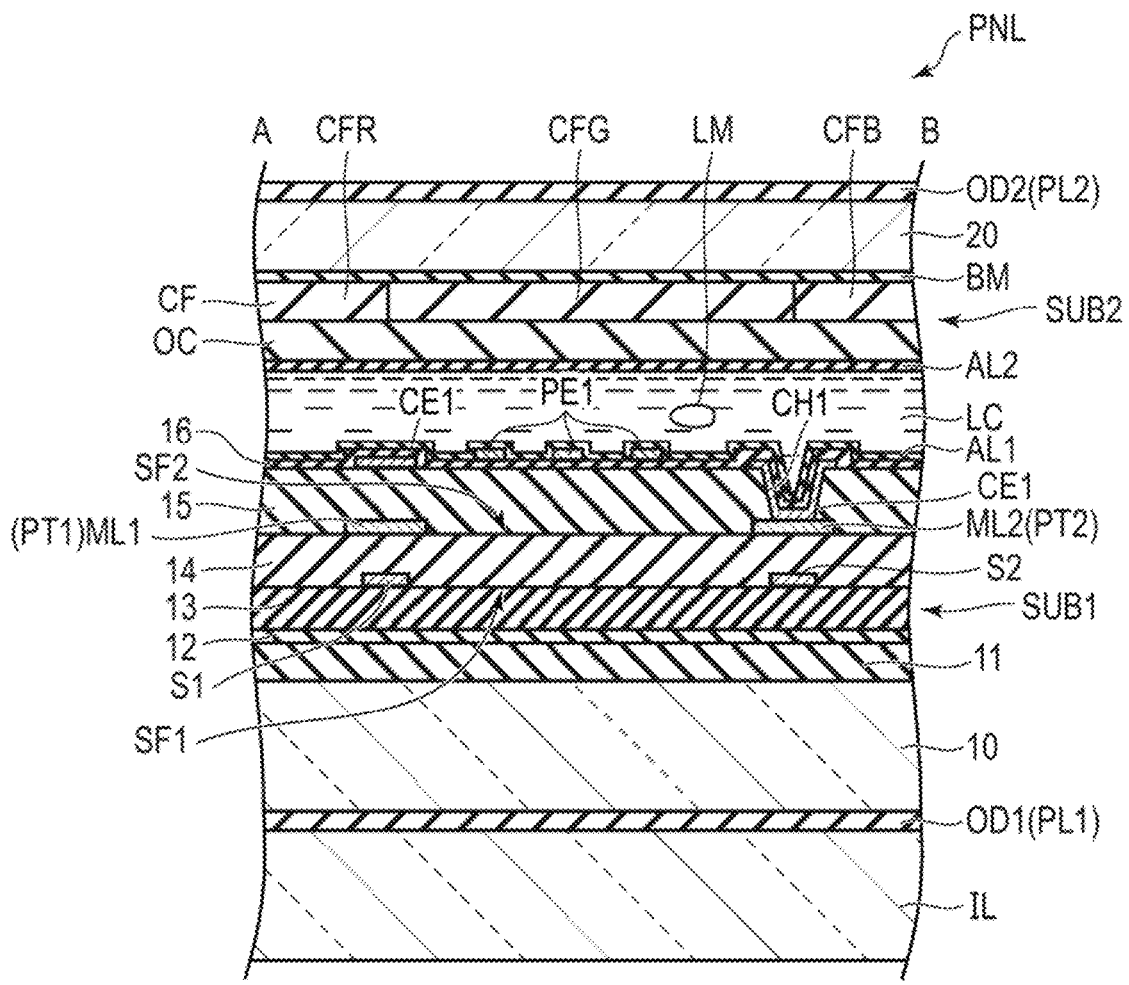
FIG. 7 is a cross-sectional view showing a display panel taken along line A-B shown in FIG. 6.

FIG. 7 is a cross-sectional view showing the display panel PNL taken along line A-B shown in FIG. 6.

The first substrate SUB1 comprises an insulating substrate 10, insulating films 11 to 16, the signal lines S1 and S2, the metal lines ML1 and ML2, the common electrode CE1, the pixel electrode PE1, and an alignment film AL1.

The insulating substrate 10 is a light transmissive substrate such as a glass substrate or a flexible resin substrate. The insulating film 11 is located on the insulating substrate 10. The insulating film 12 is located on the insulating film 11. The insulating film 13 is located on the insulating film 12.

The signal lines S1 and S2 are located on the insulating film 13. The signal lines S1 and S2 are formed of a metal material such as aluminum (Al), titanium (Ti), silver (Ag), molybdenum (Mo), tungsten (W), copper (Cu), or chromium (Cr), or an alloy obtained by combining the metal materials, and may have a single-layer structure or a multilayer structure. For example, the signal lines S1 and S2 are a stacked layer body formed by stacking a first layer containing titanium (Ti), a second layer containing aluminum (Al), and a third layer containing titanium (Ti) in this order.

The insulating film (first organic insulating film or first insulating film) 14 covers the signal lines S1 and S2. The insulating film 14 includes a first surface SF1, and a second surface SF2 on a side opposite to the first surface SF1. The metal lines ML1 and ML2 are arranged on the second surface SF2 of the insulating film 14. The insulating film (second insulating film) 15 covers the metal lines ML1 and ML2. That is, the metal lines ML1 and ML2 are located between the insulating film 14 and the insulating film 15. The metal lines ML1 and ML2 are formed of the above-described metal material, an alloy formed of a combination of the above metal materials, or the like, and may have a single-layer structure or a multilayer structure. For example, the metal lines ML1 and ML2 are the stacked layer bodies formed by stacking a first layer containing titanium (Ti), a second layer containing aluminum (Al), and a third layer containing titanium (Ti) in this order, or the stacked layer bodies formed by stacking a first layer containing molybdenum (Mo), a second layer containing aluminum (Al), and a third layer containing molybdenum (Mo) in this order. The insulating film 15 is provided between the insulating film 16 and the second surface SF2 of the insulating film 14.

The common electrode CE1 is located on the insulating film 15. The common electrode CE1 is provided between the insulating film 15 and the insulating film 16. The common electrode CE1 is in contact with the second portion PT2 through the contact hole CH1 formed in the insulating film 15, at the position overlaid on the second portion PT2 of the metal line ML2. The common electrode CE1 is a transparent electrode formed of a transparent conductive material such as indium tin oxide (ITO) or indium zinc oxide (IZO). The insulating film 16 covers the common electrode CE1. Incidentally, in the example illustrated, the common electrode CE1 is connected to the metal line ML2. However, the common electrode CE1 may be connected to the metal line ML1 or connected to both the metal lines ML1 and ML2.

The pixel electrode PE1 is located on the insulating film 16 and is covered with the alignment film AL1. That is, the pixel electrode PE1 is provided between the insulating film 16 and the alignment film AL1. The pixel electrode PE1 is a transparent electrode formed of a transparent conductive material such as ITO or IZO. The alignment film AL1 also covers the insulating film 16.

Each of the insulating films 11 to 13, and the insulating film 16 is an inorganic insulating film formed of an inorganic insulating material such as silicon oxide, silicon nitride, or silicon oxynitride, and may have a single-layer structure or a multilayer structure. Each of the insulating films 14 and 15 is an organic insulating film formed of, for example, an organic insulating material such as acrylic resin.

The second substrate SUB2 comprises an insulating substrate 20, the light-shielding layer BM, a color filter CF, an overcoat layer OC, and an alignment film AL2.

The insulating substrate 20 is a light transmissive substrate such as a glass substrate or a resin substrate, similarly to the insulating substrate 10. The light-shielding layer BM and the color filter CF are located on a side of the second insulating substrate 20, which is opposed to the first substrate SUB1. The color filter CF includes a red color filter CFR, a green color filter CFG, and a blue color filter CFB. The overcoat layer OC covers the color filter CF. The overcoat layer OC is formed of a transparent resin. The alignment film AL2 covers the overcoat layer OC. The alignment film AL1 and the alignment film AL2 are formed of, for example, a material exhibiting horizontal alignment properties.

The first substrate SUB1 and the second substrate SUB2 described above are arranged such that the alignment film AL1 and the alignment film AL2 are opposed to each other. The first substrate SUB1 and the second substrate SUB2 are bonded to each other by a sealant with a predetermined cell gap formed between the substrates. The liquid crystal layer LC is held between the first alignment film AL1 and the second alignment film AL2. The liquid crystal layer LC comprises liquid crystal molecules LM. The liquid crystal layer LC is composed of a liquid crystal material of a positive type (having positive dielectric anisotropy) or a negative type (having negative dielectric anisotropy).

An optical element OD1 including a polarizer PL1 is bonded to the insulating substrate 10. An optical element OD2 including a polarizer PL2 is bonded to the insulating substrate 20. Incidentally, each of the optical element OD1 and the optical element OD2 may comprise a retardation film, a scattering layer, an antireflective layer, and the like as needed.

In the display panel PNL, the liquid crystal molecules LM are initially aligned in a predetermined direction between the alignment film AL1 and the alignment film AL2, in an off state in which no electric field is produced between the pixel electrode PE and the common electrode CE. In the off state, light emitted from an illumination device IL to the display panel PNL is absorbed by the optical element OD1 and the optical element OD2 such that dark display is exhibited. In contrast, in an on state in which an electric field is produced between the pixel electrode PE and the common electrode CE, the liquid crystal molecules LM are aligned in a direction different from the initial alignment direction by the electric field, and this alignment direction is controlled by the electric field. In the on state, part of the light from the illumination device IL is transmitted through the optical element OD1 and the optical element OD2 such that bright display is exhibited.

Figure 8:
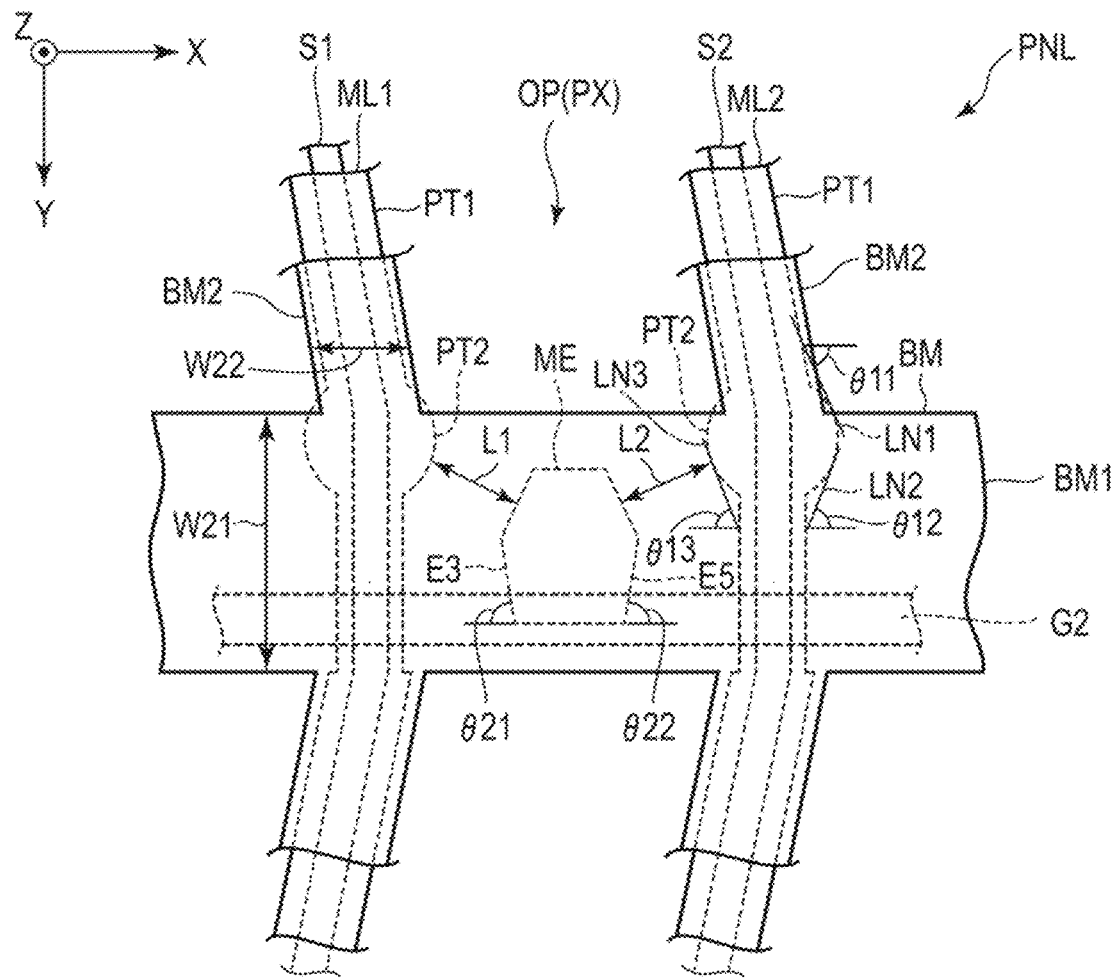
FIG. 8 is a plan view showing a positional relationship among the metal line and the metal electrode shown in FIG. 6 and a light-shielding layer.

FIG. 8 is a plan view showing a positional relationship among the metal lines ML1 and ML2 and the metal electrode ME shown in FIG. 6, and the light-shielding layer BM.

The light-shielding layer BM includes a first light-shielding portion BM1 overlaid on the scanning line G2 and extending in the first direction X, and a second light-shielding portion BM2 overlaid on the signal lines S1 and S2 and extending in the second direction Y. A first width W21 of the first light-shielding portion BM1 in the second direction Y is larger than a second width W22 of the second light-shielding portion BM2 in the first direction X. An area surrounded by the first light-shielding portion BM1 and the second light-shielding portion BM2 corresponds to an opening portion OP of the pixel PX. The first portion PT1 is overlaid on the second light-shielding portion BM2 and extends in the second direction Y. In the example illustrated, a part of the first portion PT1 is also overlaid on the first light-shielding portion BM1. In addition, the second portion PT2 is overlaid on the first light-shielding portion BM1. In the example illustrated, a part of the second portion PT2 is also overlaid on the second light-shielding portion BM2. The metal electrode ME is overlaid on the first light-shielding portion BM1.

The shape of the second portion PT2 may be based on tangent LN1 of angle θ11 to the first direction X, tangent LN2 of angle θ12 to the first direction X, and tangent LN3 of angle θ13 to the first direction X. Each of the angles θ11 and θ12 is 65 degrees or more and the angle θ13 is 70 degrees or more. In addition, angle θ21 of the side E3 of the metal electrode ME to the first direction X, and angle θ22 of the side E5 to the first direction X are desirably 65 to 75 degrees or more to suppress occurrence of depolarization. Since the sides E3 and E5 are inclined to the scanning line G2, an area of the metal electrode ME can be reduced and the parasitic capacitance between the metal electrode ME and the scanning line G2 can be reduced.

For example, when the second portion PT2 has a rectangular shape, the second portion PT2 is arranged under the second light-shielding portion BM2 to secure the predetermined distances L1 and L2. However, the second portion PT2 is overlaid on the opening portion OP of the pixel PX, which may reduce the aperture ratio. In addition, when the second portion PT2 has a rectangular shape, the parasitic capacitance between the second portion PT2 and the metal electrode ME may increase and the yields may be lowered.

According to the embodiments, the outer shape of the second portion PT2 is formed in an arcuate shape. Alternatively, the second portion PT2 is formed in a circular shape or a polygonal shape larger than four sides. For this reason, the second portion PT2 can be made closer to the scanning line G2 while maintaining the predetermined distances L1 and L2, and the second portion PT2 can be arranged at the position overlaid on the first light-shielding portion BM1. The above-described reduction in an aperture ratio can be therefore suppressed. In addition, depolarization is often caused by forming the second portion PT2 in a circular shape or a polygonal shape larger than four sides. Since the second portion PT2 is overlaid on the first light-shielding portion BM1, reduction of display contrast can be suppressed. In addition, the reduction in yields caused by occurrence of the parasitic capacitance can be suppressed.

Incidentally, as shown in FIG. 6, the contact hole CH1 of the insulating film 15 may not be formed at the position overlaid on the entire second portion PT2. In addition, the second portion PT2 may not be formed at a portion which is not connected to the common electrode.

Figure 9:
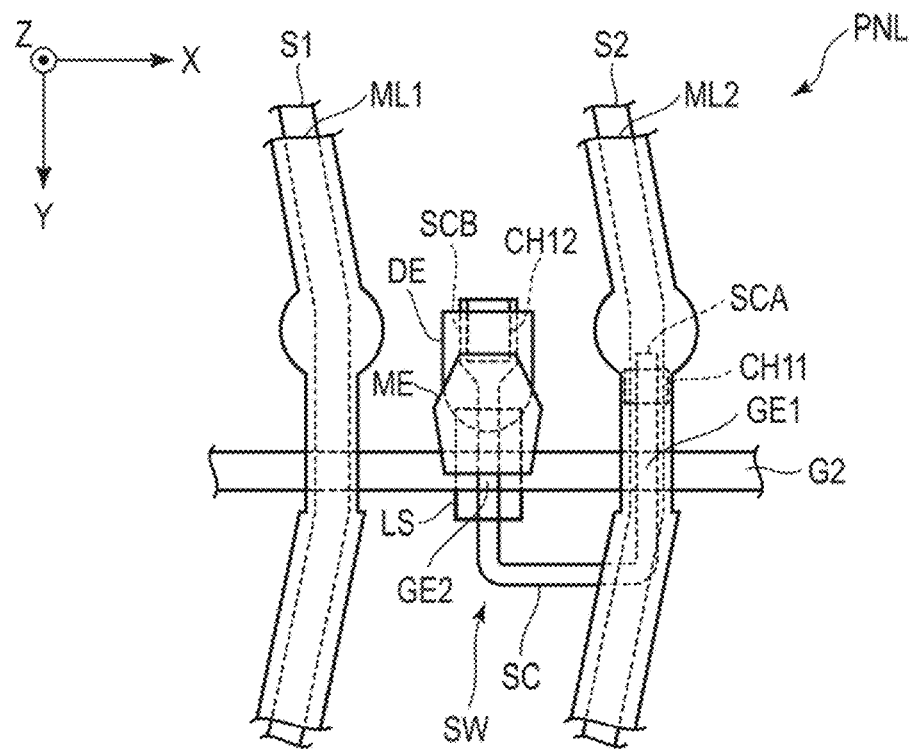
FIG. 9 is a plan view showing shapes of a semiconductor layer and a drain electrode.

FIG. 9 is a plan view showing shapes of a semiconductor layer SC and a drain electrode DE.

The display panel PNL comprises a drain electrode DE in an insular shape, which is formed of the same material as the signal lines S1 and S2. The drain electrode DE is arranged between the signal lines S1 and S2. The pixel electrode PE is provided at the switching element SW. Incidentally, in the switching element SW, the drain electrode DE is often referred to as a source electrode. The drain electrode DE is overlaid on the metal electrode ME in planar view.

The semiconductor layer SC is arranged to be partially overlaid on the signal line S2, and the other part extends between the signal lines S1 and S2 to be substantially shaped in a U letter. The semiconductor layer SC crosses the scanning line G2 at a position overlaid on the signal line S2 and also crosses the scanning line G2 at a position between the signal lines S1 and S2. In the scanning line G2, areas overlaid on the semiconductor layer SC function as gate electrodes GE1 and GE2, respectively. That is, the switching element SW of the illustrated example has a double-gate structure. The semiconductor layer SC is electrically connected to the signal line S2 through a contact hole CH11 at an end portion SCA of the semiconductor layer SC, and is electrically connected to the drain electrode DE through a contact hole CH12 at the other end portion SCB of the semiconductor layer SC. The display panel PNL comprises a light-shielding film LS overlaid on a gate electrode GE2. The light-shielding film LS is also overlaid on a part of the metal electrode ME and a part of the drain electrode DE.

Figure 10:
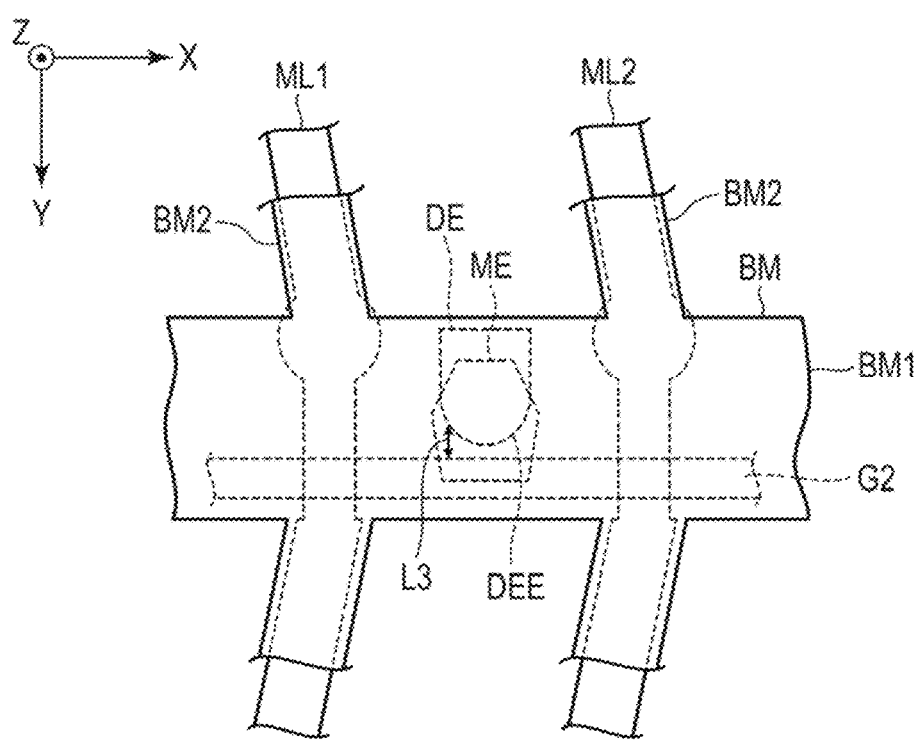
FIG. 10 is a plan view showing a positional relationship between the drain electrode shown in FIG. 9 and the light-shielding layer.

FIG. 10 is a plan view showing a positional relationship between the drain electrode DE shown in FIG. 9 and the light-shielding layer BM.

The drain electrode DE is overlaid on the first light-shielding portion BM1. The drain electrode DE includes an arcuate edge DEE (third edge) opposed to the scanning line G2 in planar view. Since the drain electrode DE includes the arcuate edge DEE, the distance L3 between the drain electrode DE and the scanning line G2 can be partially increased. For this reason, the parasitic capacitance between the drain electrode DE and the scanning line G2 can be reduced. Therefore, the reduction in yields caused by occurrence of the parasitic capacitance can be suppressed. In addition, the metal electrode ME covers the edge DEE. Depolarization is often caused by forming the edge DEE in an arcuate shape. The edge DEE is overlaid on the first light-shielding portion BM1 but reduction of contrast may be visually recognized from a viewing angle inclined to the third direction Z. In the example illustrated, since the metal electrode ME located in the layer lower than the light-shielding layer BM is overlaid on the edge DEE, visual recognition of the reduction of contrast which is caused by depolarization from the inclined viewing angle can be suppressed.

Figure 11:
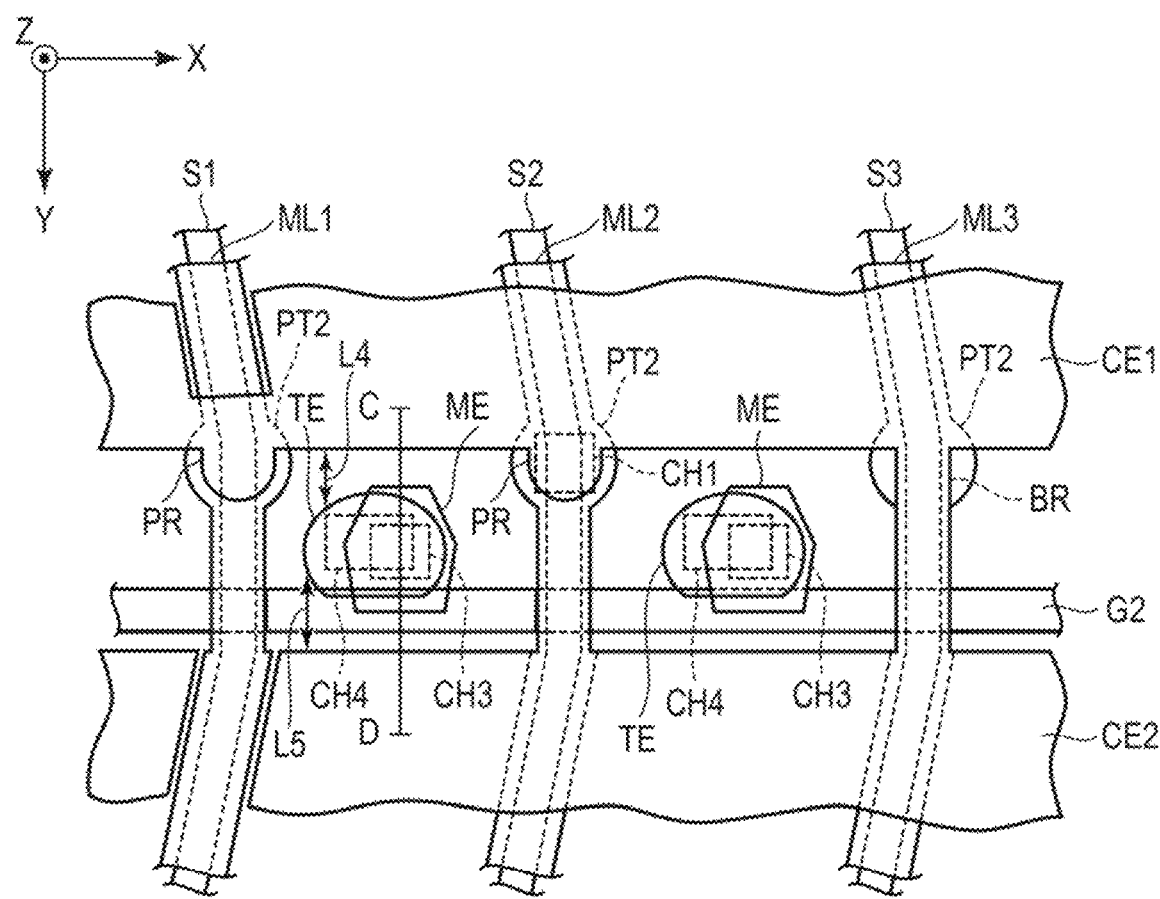
FIG. 11 is a plan view showing shapes of a common electrode and transparent electrodes.

FIG. 11 is a plan view showing shapes of the common electrodes CE1 and CE2 and the transparent electrodes TE.

The transparent electrodes TE are overlaid on the metal electrodes ME and are formed in an insular shape in planar view. In the example illustrated, the transparent electrodes TE have an elliptic shape (nonrectangular shape). Incidentally, the transparent electrodes TE may be in a polygonal shape larger than four sides. Several sides of the sides forming the polygonal shape may be curves. The transparent electrodes TE are formed of the same material as the common electrode CE1. The transparent electrodes TE are overlaid on the contact holes CH3 formed in the insulating film 15. The transparent electrodes TE are connected to the metal electrodes ME through the contact holes CH3. In addition, the transparent electrodes TE are overlaid on contact holes CH4 formed in the insulating film 16. The transparent electrodes TE are connected to the pixel electrodes through the contact holes CH4. Thus, the transparent electrodes TE are overlaid on the contact holes CH3 and CH4 and are more elongated in the first direction X than in the second direction Y. That is, the transparent electrodes TE are formed in a substantially elliptic shape (nonrectangular shape) or a polygonal shape having n corners where n is an integer larger than four, in a state of maintaining the area for arranging the contact holes CH3 and CH4, in planar view.

Since the transparent electrodes TE are formed in an elliptic shape or a polygonal shape larger than four sides, a distance L4 between the transparent electrodes TE and the common electrode CE1 and a distance L5 between the transparent electrodes TE and the common electrode CE2 can be increased. For this reason, the parasitic capacitance between the transparent electrodes TE and the common electrode CE1 and the parasitic capacitance between the transparent electrodes TE and the common electrode CE2 can be reduced. Furthermore, as regards the transparent electrode TE located adjacent to the bridge portion BR, the parasitic capacitance between the transparent electrode TE and the bridge portion BR can be reduced. In addition, the reduction in yields caused by occurrence of these parasitic capacitances can be suppressed.

The metal electrodes ME are located between the common electrode CE1 and the common electrode CE2 in planar view. The common electrode CE1 includes protruding portions PR which protrude to the common electrode CE2 side. The protruding portions PR are overlaid on the second portions PT2. In addition, the protruding portion PR is overlaid on the contact hole CH1 at a position overlaid on the second portion PT2 of the metal line ML2. The protruding portion PR is connected to the second portion PT2 through the contact hole CH1. Incidentally, the protruding portion PR may not be formed at the portion where the common electrode CE1 and the metal line ML are not connected.

Figure 12:
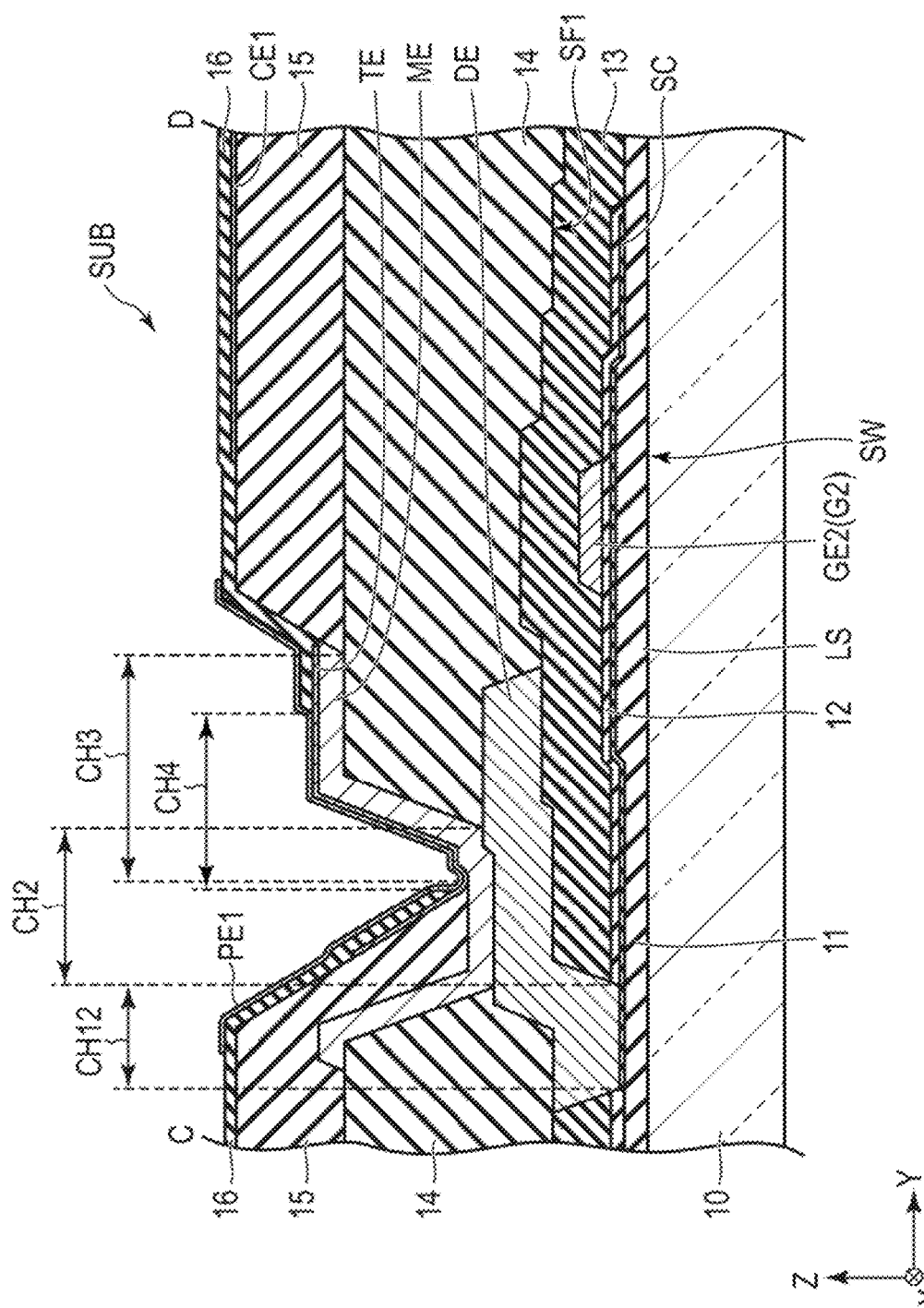
FIG. 12 is a cross-sectional view showing a first substrate taken along line C-D shown in FIG. 11.

FIG. 12 is a cross-sectional view showing the first substrate SUB1 taken along line C-D shown in FIG. 11.

The light-shielding film LS is formed on the insulating substrate 10 and is covered with the insulating film 11. The first surface SF1 of the insulating film 14 covers the switching element SW. The semiconductor layer SC is located on the insulating film 11 and is covered with the insulating film 12. The semiconductor layer SC is formed of, for example, polycrystalline silicon, but may be formed of amorphous silicon or an oxide semiconductor.

The gate electrode GE2, which is a part of the scanning line G2, is located on the insulating film 12 and is covered with the insulating film 13. The gate electrode GE2 is provided on the switching element SW. The scanning line G2 is formed of a metal material such as aluminum (Al), titanium (Ti), silver (Ag), molybdenum (Mo), tungsten (W), copper (Cu) or chromium (Cr) or an alloy obtained by combining the metal materials and may have a single-layer structure or a multilayer structure. For example, the scanning line G2 is formed of a molybdenum tungsten alloy.

The drain electrode DE is located on the insulating film 13 and is covered with the insulating film 14. The drain electrode DE is in contact with the first surface SF1 of the insulating film 14. The drain electrode is in contact with the semiconductor layer SC through the contact hole CH12 formed in the insulating film 13. The metal electrode ME is arranged on the second surface SF2 of the insulating film 14 and is covered with the insulating film 15. That is, the metal electrode ME is located between the insulating films 14 and 15. The metal electrode ME is in contact with the drain electrode DE through the contact hole CH2 formed in the insulating film 14. The transparent electrode TE is arranged on the insulating film 15 and is covered with the third insulating film 16. The insulating film 16 is located on the insulating films 14 and 15. The transparent electrode TE is located between the insulating films 14 and 16. In addition, the transparent electrode TE is located between the insulating films 15 and 16. The transparent electrode TE is in contact with the metal electrode ME through the contact hole CH3 formed in the insulating film 15. The pixel electrode PE is located on the insulating film 16. The pixel electrode PE is in contact with the transparent electrode TE through the contact hole CH4 formed in the insulating film 16. The drain electrode DE, the metal electrode ME, and the transparent electrode TE are overlaid in the third direction Z.

FIG. 13 is a plan view showing a position of the spacer SP. The structure shown in FIG. 13 is different from the structure shown in FIG. 11 with respect to a feature that the spacer SP is arranged at a position overlaid on the second portion PT2 of the metal line ML1.

The spacer SP is also overlaid on the protruding portion PR of the common electrode CE1. Incidentally, the spacer SP is not arranged at a position overlaid on the contact hole CH1.

Figure 14:
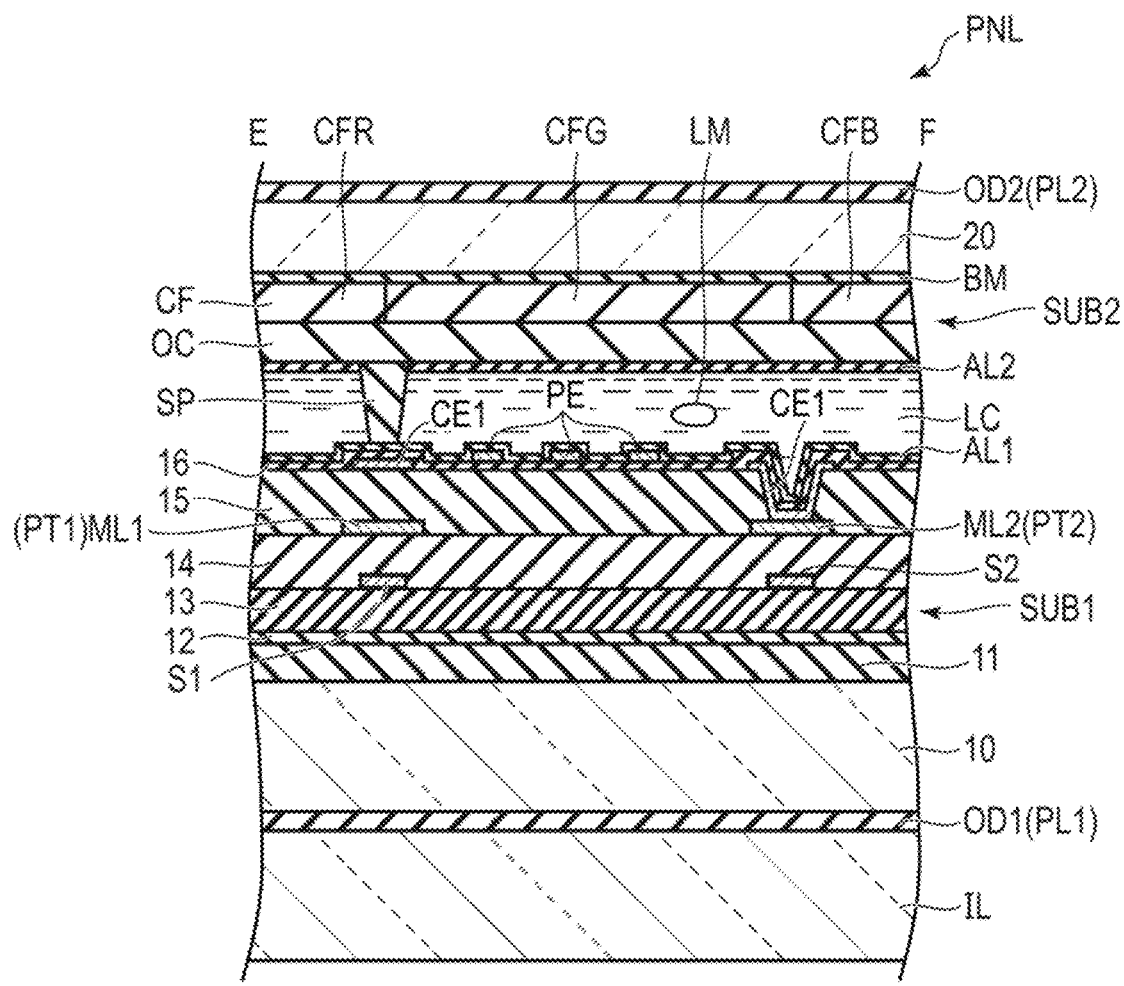
FIG. 14 is a cross-sectional view showing a display panel taken along line E-F shown in FIG. 13.

FIG. 14 is a cross-sectional view showing the display panel PNL taken along line E-F shown in FIG. 13. The structure shown in FIG. 14 is different from the structure shown in FIG. 7 with respect to a feature that the spacer SP is arranged.

In the example illustrated, the spacer SP is provided in the second substrate SUB2. The spacer SP protrudes to the first substrate SUB1 side and abuts on the first substrate SUB1. Incidentally, the spacer SP may not be in contact with the first substrate SUB1. Thus, the spacer SP may be arranged at the portion where the contact hole CH1 is not formed in the insulating film 15, at the position overlaid on the second portion PT2 of the metal line ML.

As described above, according to the embodiments, a display device capable of increasing the aperture ratio of the pixels can be obtained.

While certain embodiments have been described, these embodiments as used for a semiconductor substrate comprising a plurality of thin-film transistors, have presented a display device by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

What is claimed is:
1. A semiconductor substrate comprising:
a switching element;
a first organic insulating film covering the switching element;
a first metal line and a second metal line arranged in a first direction and extending in a second direction intersecting the first direction;
a pixel electrode located between the first metal line and the second metal line, in planar view;
a metal electrode in an insular shape located between the first metal line and the second metal line;
an inorganic insulating film located on the first organic insulating film; and
an alignment film covering the inorganic insulating film, wherein
the first organic insulating film includes a first surface and a second surface on a side opposite to the first surface,
the switching element is covered with the first surface,
the first metal line, the second metal line, and the metal electrode are located on the second surface side, and are located between the second surface and the inorganic insulating film,
the pixel electrode is located between the inorganic insulating film and the alignment film, and is connected to the metal electrode through a contact hole formed in the inorganic insulating film,
the first metal line includes a first portion extending in the second direction and a second portion having a width larger than a width of the first portion,
the second portion includes an arcuate first edge and an arcuate second edge located on a side opposite to the first edge, in planar view, and
the metal electrode has a polygonal shape having n corners or an elliptic shape where n is larger than four.
2. The semiconductor substrate of claim 1, further comprising:
a scanning line extending in the first direction, wherein
the switching element comprises a drain electrode and a gate electrode which is a part of the scanning line,
the drain electrode is in contact with the first surface of the first organic insulating film,
the metal electrode is connected to the drain electrode through a contact hole formed in the first organic insulating film, and
the drain electrode includes an arcuate third edge opposed to the scanning line in planar view.
3. The semiconductor substrate of claim 2, further comprising:
a transparent electrode in an insular shape located between the first organic insulating film and the inorganic insulating film, wherein
the transparent electrode is connected to the metal electrode, and
the transparent electrode has a polygonal shape having n corners or an elliptic shape in planar view, where n is larger than four.
4. The semiconductor substrate of claim 3, wherein
the pixel electrode is connected to the transparent electrode through the contact hole formed in the inorganic insulating film, and
the pixel electrode is connected to the metal electrode by the transparent electrode.

5. The semiconductor substrate of claim 4, further comprising:
a second organic insulating film provided between the inorganic insulating film and the second surface of the first organic insulating film,
wherein
the transparent electrode is provided between the second organic insulating film and the inorganic insulating film, and
the transparent electrode is connected to the metal electrode through a contact hole formed in the second organic insulating film.

6. The semiconductor substrate of claim 5, further comprising:
a common electrode provided between the second organic insulating film and the inorganic insulating film,
wherein
the common electrode is overlaid on the pixel electrode, and
the common electrode is connected to the first metal line or the second metal line through a contact hole formed in the second organic insulating film.

7. The semiconductor substrate of claim 6,
wherein
the common electrode is a sensor electrode.

8. The semiconductor substrate of claim 3, wherein
the drain electrode, the metal electrode, and the transparent electrode are overlaid on each other in planar view.

9. A display device comprising:
a scanning line extending in a first direction;
a signal line extending in a second direction intersecting the first direction;
a first insulating film covering the signal line;
a first metal line arranged on the first insulating film and extending while overlaid on the signal line;
a metal electrode in an insular shape arranged on the first insulating film and formed of a same material as the first metal line;
a second insulating film covering the first metal line and the metal electrode;
a first common electrode located on the second insulating film;
a second common electrode arranged parallel to the second direction of the first common electrode; and
a light-shielding layer including a first light-shielding portion overlaid on the scanning line and extending in the first direction and a second light-shielding portion overlaid on the signal line and extending in the second direction, wherein
the first metal line includes a first portion overlaid on the second light-shielding portion and extending in the second direction and a second portion overlaid on the first light-shielding portion and having a width larger than a width of the first portion,
the first common electrode is in contact with the second portion through a first contact hole formed in the second insulating film at a position overlaid on the second portion, and
the second portion includes an arcuate first edge and an arcuate second edge located on a side opposite to the first edge, in planar view,
the metal electrode is located between the first common electrode and the second common electrode in planar view,
the first common electrode includes a protruding portion protruding to the second common electrode side, and
the protruding portion is overlaid on the second portion of the first metal line.

10. The display device of claim 9, wherein
a width of the first light-shielding portion in the second direction is larger than a width of the second light-shielding portion in the first direction.

11. The display device of claim 9, further comprising:
a second metal line located between the first insulating film and the second insulating film and extending in the second direction,
wherein
the metal electrode is located between the first metal line and the second metal line and is overlaid on the first light-shielding portion, and has a polygonal shape larger than four sides or an elliptic shape.

12. The display device of claim 9, further comprising:
a drain electrode in an insular shape overlaid on the first light-shielding portion and formed of a same material as the signal line,
wherein
the metal electrode is in contact with the drain electrode through a second contact hole formed in the first insulating film, and
the drain electrode includes an arcuate third edge opposed to the scanning line in planar view.

13. The display device of claim 12, wherein
the metal electrode covers the third edge.

14. A display device comprising:
a scanning line extending in a first direction;
a signal line extending in a second direction intersecting the first direction;
a first insulating film covering the signal line;
a first metal line arranged on the first insulating film and extending while overlaid on the signal line;
a metal electrode in an insular shape arranged on the first insulating film and formed of a same material as the first metal line;
a second insulating film covering the first metal line and the metal electrode;
a first common electrode located on the second insulating film;
a transparent electrode in an insular shape located on the second insulating film and overlaid on the metal electrode; and
a light-shielding layer including a first light-shielding portion overlaid on the scanning line and extending in the first direction and a second light-shielding portion overlaid on the signal line and extending in the second direction, wherein
the first metal line includes a first portion overlaid on the second light-shielding portion and extending in the second direction and a second portion overlaid on the first light-shielding portion and having a width larger than a width of the first portion,
the first common electrode is in contact with the second portion through a first contact hole formed in the second insulating film at a position overlaid on the second portion,
the second portion includes an arcuate first edge and an arcuate second edge located on a side opposite to the first edge, in planar view, and
the transparent electrode is in contact with the metal electrode through a third contact hole formed in the second insulating film and has an elliptic shape or a polygonal shape larger than four sides.

15. The display device of claim 14, further comprising:
a second common electrode arranged parallel to the second direction of the first common electrode,
wherein
the metal electrode is located between the first common electrode and the second common electrode in planar view,
the first common electrode includes a protruding portion protruding to the second common electrode side, and
the protruding portion is overlaid on the second portion of the first metal line.

16. The display device of claim 14, wherein
the first insulating film and the second insulating film are formed of an organic insulating material.

* * * * *